April 22, 1924.
F. J. LUKINS
VALVE
Filed March 16, 1922
1,491,541
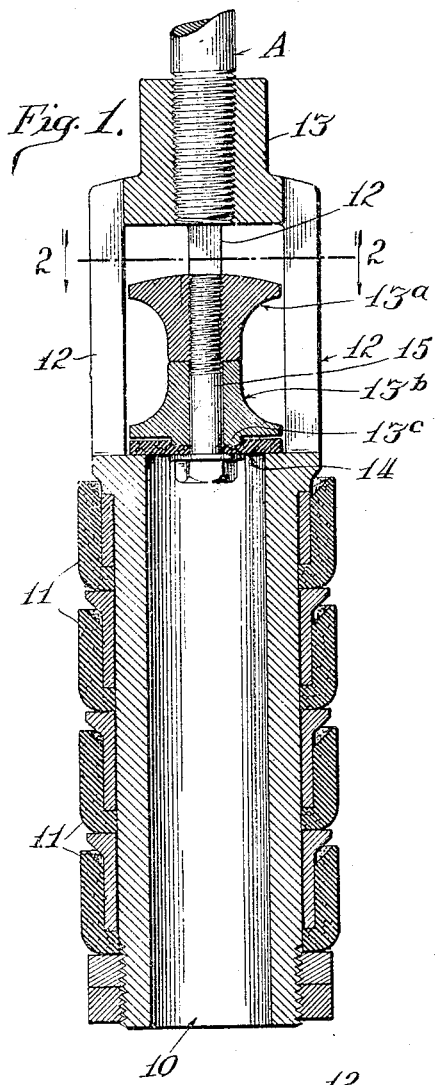
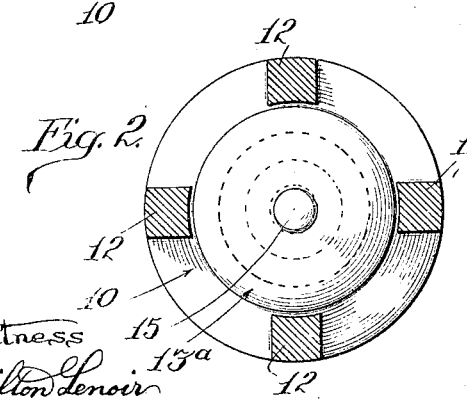
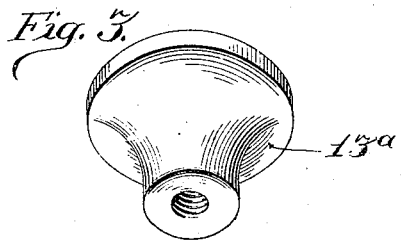
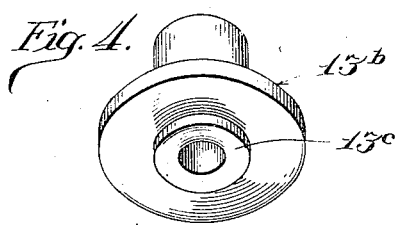
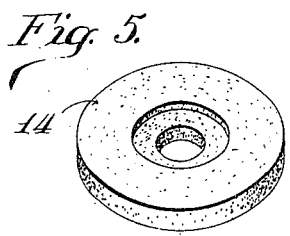
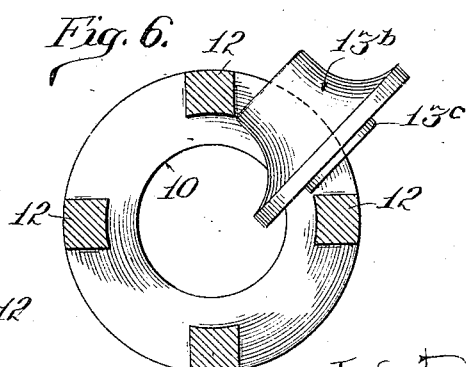

Patented Apr. 22, 1924.

1,491,541

UNITED STATES PATENT OFFICE.

FRED J. LUKINS, OF ARTESIA, NEW MEXICO.

VALVE.

Application filed March 16, 1922. Serial No. 544,149.

*To all whom it may concern:*

Be it known that I, FRED J. LUKINS, a citizen of the United States, and a resident of Artesia, in the county of Eddy and State of New Mexico, have invented certain new and useful Improvements in Valves, of which the following is a specification, reference being had to the accompanying drawings.

My invention relates to improvements in that type of valve devices used in connection with and as a part of pumping apparatus employed in the raising of water or oil from wells, the movable valve member of which device is secured within a cage and is freely movable up and down therein. In such devices as now made the cage referred to is connected with a cylindrical body by being screw-threaded to one end thereof, which construction permits of the ready insertion of the independently-movable valve member within the cage through the open end of such cage when such cage and the said body are separated by unscrewing one from the other. Such constructions are objectionable, however, for in many instances the said body and cage become separated from each other while in the well due to the gradual unscrewing of one part from the other, thereby causing loss of the lower part and also resulting in much inconvenience and loss of time to the user of the apparatus.

It is the object of my invention to provide a construction that will obviate such objections as above enumerated and at the same time permit the movable valve member to be inserted in and removed from its cage. Briefly stated, I accomplish this object by making the said movable valve device in a plurality of parts each of a size that will be adapted to pass between the usual bars of the cage and having such parts thereafter connected together—such manner of forming and assembling the several parts of the valve device thereby permitting the cylindrical body and cage to be solidly united one to the other. That which I claim as new will be set forth in the claims.

In the drawings,—

Fig. 1 is a longitudinal central section through a valve device embodying my improvements;

Fig. 2 is a cross-section through the cage of the device, the section being taken at line 2—2 of Fig. 1;

Figs. 3 and 4 are perspective views of the upper and lower parts, respectively, of the valve member that is located within the cage;

Fig. 5 is a perspective view of a disc attached to the lower end of the valve member and adapted to bear upon the usual seat for effecting the shutting off of the flow of water through the valve; and Fig. 6 is a view like Fig. 2 but showing one of the valve member parts as it appears in being passed through the bars of the cage.

Referring to the several figures of the drawings: 10 indicates the lower cylindrical body portion of a valve device provided in the usual manner on its outer surface with packing pieces 11 of leather or other material such as ordinarily used for such purpose, and against the under one of which is screwed the usual retaining nuts. Connected with the upper end of the body member 10 is a cage, the bars of which are spaced at equal distances apart and will ordinarily be four in number. Such cage-bars are indicated by 12. The upper end of the cage is provided with a head 13, as usual, centrally bored and screw-threaded to receive an ordinary operating rod A. The body member 10 and the cage are ordinarily made in separate parts and screw-threaded together, but I contemplate having such two parts firmly united so as to prevent any possibility of their being separated while down in the well, and I prefer to make them integral with each other. When the cage can be separated from the body, the movable valve member that is located in the cage can of course be inserted through the open lower end of the cage before such cage is connected with the body, but by making such parts fixedly secured together as herein shown it is impossible to so insert such valve member, as the bore of the body portion 10 is too small to re- it. I therefore make such valve member in a plurality of parts, each of said parts being of a size to adapt it to be passed between the bars 12 of the cage. The approved form of such valve member is, generally speaking, that of a spool, and I retain such shape, and in the construction shown the two principal members of such valve member that together form a device of spool shape are indicated by $13^a$ and $13^b$. The lower part $13^b$ has centrally of its lower face an annular projection $13^c$ that projects into an annular ring 14 of any desired flexible material, which is adapted to rest against a seat so as to effectively cut off the passage of the liquid being pumped, as usual. In the construction shown the seat for this flexible part 14 is provided by the upper end of the body 10. In the construction shown the two parts 13ª and 13ᵇ of the valve member are held together, and the ring 14 is held in place, by a bolt 15 passing through such parts. As shown, the central opening through the lower part 13ᵇ is unthreaded, whereas the corresponding opening in the other part 13ª is threaded, and the bolt therefore passes freely through the lower part but has screw-threaded engagement with the upper part. It is to be understood, however, that I do not confine myself to securing the parts of the valve member together in the precise manner shown, except as specifically claimed in some one or more of the claims appended hereto, nor do I intend to confine my invention to the use of a valve member made of two such principal parts, nor to have such parts when assembled and united of the shape and style here shown. These are details which may be varied from in various ways.

From an inspection of Fig. 6, it will be readily seen how the parts of the valve member may be passed between the bars of the cage. When separately inserted in that manner they can be very readily arranged in proper relation one to the other, and when they are to be secured together by a bolt, as shown, such bolt can be inserted through the lower end of the body 10 and easily manipulated by means of an appropriate wrench.

What I claim as my invention and desire to secure by Letters Patent, is—

1. A valve device comprising in combination an open-ended cylindrical body, a cage at one end of said body and in immovable relation to such body, a longitudinally-movable valve member within said cage formed of a plurality of parts each of a size to be separately inserted in or removed from the cage between the bars thereof but when in assembled position not adapted to be so inserted or removed, and means for holding said parts together.

2. A valve device comprising in combination an open-ended cylindrical body, a cage at one end of said body and in immovable relation to such body, a longitudinally-movable valve member within said cage formed of a plurality of parts each of a size to be separately inserted in or removed from the cage between the bars thereof but when in assembled position not adapted to be so inserted or removed, and a headed bolt for holding said parts together, the head of said bolt lying within said bore when the valve is closed.

FRED J. LUKINS.